July 26, 1960

H. H. G. F. SCHWARZER 2,946,645

METHOD FOR REGISTERING SIGNAL VOLTAGES, PARTICULARLY
OF PHYSIOLOGICAL ORIGIN, BY MEANS OF
MECHANICALLY RECORDING OSCILLOGRAPHS

Filed Feb. 17, 1953

INVENTOR.
Hans Hermann Gustav
Friedrich Schwarzer
BY
Michael S. Striker
Attorney

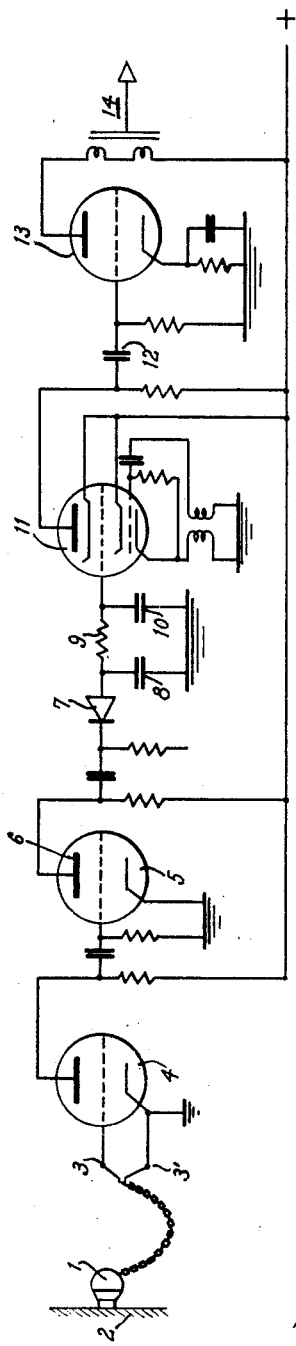

United States Patent Office 2,946,645
Patented July 26, 1960

2,946,645

METHOD FOR REGISTERING SIGNAL VOLTAGES, PARTICULARLY OF PHYSIOLOGICAL ORIGIN, BY MEANS OF MECHANICALLY RECORDING OSCILLOGRAPHS

Hans Hermann Gustav Friedrich Schwarzer, 58 Paul-Gerhardt-Allee, Munich-Pasing, Germany Filed Feb. 17, 1953, Ser. No. 337,344

Claims priority, application Germany Feb. 22, 1952

4 Claims. (Cl. 346—33)

The present invention relates to recording devices adapted to trace curves representing oscillations in the manner of an oscillograph, preferably comprising so-called direct-writing recorders and preferably used for physiological purposes. As commonly known, the direct-writing recorders have a restricted freqency range which, especially in the case of physiological frequencies, is often insufficient. The efforts presently made in the art to increase the frequency range of direct-writing recorders encounter insurmountable difficulties, especially due to the fact that the power input required increases more than linearly with the increase of the upper limit frequency. The desirable reduction of the apparatus weight having reached its lowest conceivable limit in the case of the dry-writing recorders which can be said to be the only recorders presently recognized as being appropriate, a reduction of the required power input can hardly be expected from known steps so far taken in this direction. Therefore a recorder reproducing 200 c.p.s. satisfactorily is presently considered in the art as the optimum obtainable, especially from the standpoint of economy. The frequency range required for many purposes, such as for recording heart sounds, extends up to 600, and even 1000 c.p.s. As will be seen from the following, it has to be mentioned here, that a feeding speed of from 25 to 50 mm./sec. (1 to 2 in. per second) for the recording tape is convenient and usual for recordings of this kind. (These speeds are also standardized for electrocardiographs.)

For most practical purposes it is necesary to see a recorded curve immediately upon recording as this, for example, affords the only possibility for effecting adjustments of the recorder based on the appearing curve.

It is, therefore, a main object of the present invention to provide a system using direct mechanical recording, which permits of recording input signal voltages of comparatively high frequencies, using mechanical recording devices limited to a frequency range substantially lower than that of the input signal.

The present invention is based on the concept, that in the case of higher frequency recording it is not necessary to record accurately the shape of the curves. The correctness of this conclusion can be proved by the mere fact that with the feeding speeds mentioned above the resolving power in the direction of the time coordinate becomes so weak for frequencies above 100 c.p.s., that an evaluation of the shape of the curves is impossible. Therefore the invention does not aim at a reproduction of the actual shape of the individual wave curves of the original signal, but merely provides for a recording of a related wave illustrating the amplitude variations of the signal, which would satisfy the requirements of evaluation, respectively diagnosis. Due to the already mentioned reduced resolving power of a slow-tape recorder such a recording of the amplitude variations of the signal cannot be distinguished from a recording of the actual shape of the wave curves of the original signal. This simplification is of great practical importance as the originally existing oscillation of high frequency may, according to the invention, be transformed into an oscillation of such low frequency, that it may be easily recorded by the recording device in question, provided that the amplitudes of the recorded lower frequency are always kept approximately proportional to the amplitudes of the original higher frequency. A recording of this type, as obtainable by the invention, is illustrated by Fig. 3.

The registered signal according to the invention is derived from the envelope of the the original signal obtained by rectification and subsequent integration, this envelope itself being recorded, the envelope voltage being used to control an oscillator producing an auxiliary signal suitable for recording. In this case appears therefore on the recording tape a monofrequency trace, varying in amplitude in conformity with the amplitude variations of the original signal. As already explained, this trace can practically no longer be distinguished from a direct recording of the original signal.

In order to avoid disturbing beat effects due to interference of low original signal frequencies with the frequencies which have been artificially produced by rectification and integration for recording purposes, and which are also low, it is recommended to use high pass and low pass filters effecting separation of the individual frequency bands in a manner known as such. As the expert will understand, this may be accomplished either by using a plurality of frequency ranges to be selected by means of switches, or by using separating filters as will be explained in more detail hereafter.

The method according to the invention presents the further advantage, that under certain conditions it is possible to recognize without additional frequency analysis whether the recorded signal is above or below the upper frequency limit of the recording device itself.

These and other objects and features of the invention will be apparent from the following description of a preferred embodiment in connection with the accompanying drawings in which:

Fig. 5 is a circuit diagram showing details of a preferred embodiment of the invention.

Figure 1:
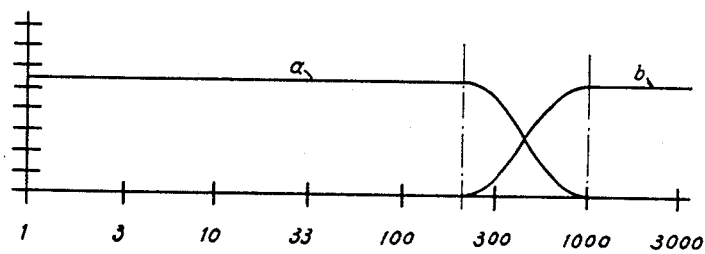
Fig. 1 is a graph illustrating the frequency response of a recorder.
Figure 2:
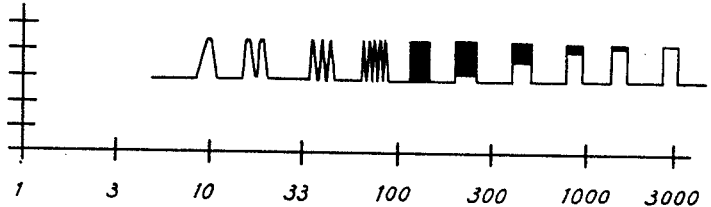
Fig. 2 is a graph illustrating a recording at various frequencies.
Figure 3:
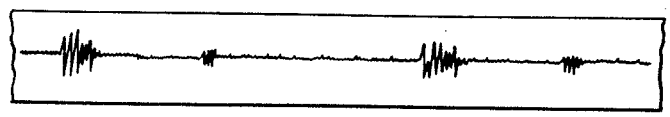
Fig. 3 is a recording of heart sounds as obtainable with the apparatus according to the invention.

In Fig. 1, the curve *a* represents the frequency response curve of a modern direct-writing recording system, which shows that the frequencies from 0 to 200 c.p.s. are reproduced linearly, while above a limit frequency—in this case 200 c.p.s.—the recording ability begins to drop sharply. The curve *b* shows the effect of the use of a low pass filter, respectively a charging unit, which would have to be connected behind the rectifier included in the amplifying system (as will be described below), in order to obtain the graph of Fig. 2. Fig. 2 shows a direct recording of a signal series of respectively different frequencies varying between 0 and 2000 c.p.s. and separated by signal-free intervals, which series has been recorded with a conventional device.

In the case of physiological potentials as well as in numerous other applications, and chiefly in the case of recording heart sounds, the signal consists of only very short spontaneous wave groups of usually high frequency. It will be readily apparent that in this case the ascending branch and the descending branch of the individual recorded waves will practically flow into each other (as shown by Fig. 2) at the normal feeding rate of the recording tape, taking into consideration that, for example in the case of the usual heart sound recording, at a tape feeding rate of 50 mm. (2 in.) per second and assuming a wave group of 10 amplitudes at 1000 c.p.s., the distance between the first and the last one of these amplitudes will only be 0.5 mm. (0.02 in.). In practical applications the number of amplitudes in a group is usually smaller. The scope of the invention may now be further enlarged by generalizing the already mentioned idea of controlling an oscillator by means of rectified impulses. If a direct recording of the voltage signals is not aimed at, effecting instead only the control of the oscillator by means of the useful signals in the whole frequency range, the recording device need to be rated only for the oscillator frequency. This constitutes a great advantage, as it is now possible to operate with a mere resonance system, whereby the driving power requirement is materially reduced.

Figure 4:
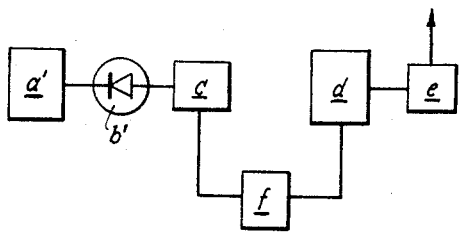
Fig. 4 is a block diagram illustrating an embodiment of the invention.

Fig. 4 shows in block diagram form the basic arrangement of preferred embodiment of the invention, $a'$ representing a pre-amplifier, $b'$ a rectifier, $c$ a peak value charging device, $d$ an output stage, and $e$ a recording device; and $f$ an auxiliary oscillator, the output of which is amplitude modulated by the rectified and integrated heart sound signals in the output of peak value charging device $c$ and fed into output stage $d$.

In order to avoid beats upon imperfect filtration at the output end of the pre-amplifier the oscillator may be slightly wobbled, this being also convenient in the case of the transposition arrangement previously described.

In cases where the frequency-analytical observation of the signal impulses to be recorded is of primary importance, for example when recording heart sounds, it is desirable to be able to represent several frequency ranges separately. Thus it may be convenient to divide the whole range into four zones extending approximately from 0 to 150, 150 to 450, 450 to 750 and 750 to 1000 c.p.s. In most instances it is even sufficient to effect a division into two zones ranging approximately from 0–150, and from 150–1000 c.p.s.

Fig. 5 shows a detailed wiring diagram of an arrangement according to the invention as it is employed in practical applications. From the body 2 which is to be auscultated the sound is picked up by a microphone 1, from where it is supplied to the input terminals 3, 3' of a two-stage amplifier in which a pre-amplification is effected through the tube stages 4 and 5. The anode 6 of the tube 5 supplies the amplified alternating voltage to a rectifier 7 which rectifies the incoming frequencies. By passing a subsequent integrating network consisting of a condenser 8, a resistor 9, and a second condenser 10, the individual alternating signal voltage impulses are integrated so that a wave corresponding to the envelope of the actual signal wave after its rectification is fed to a final stage which in turn controls the recording system 14 by means of the oscillations of comparatively low frequency of the envelope. In the embodiment illustrated these low frequency oscillations are, however, used for modulating the output of an oscillator 11 furnishing a constant carrier frequency with a low frequency which is within the recordable range of the recording system. From the anode of this oscillator the modulated monofrequency oscillations are transmitted through coupling elements 12 to the final stage 13, which in turn operates the recording system 14.

It will be understood that each of the elements described above, or two or more together, may also find a useful application in other types of recording apparatus differing from the types described above.

While the invention has been illustrated and described as embodied in recording apparatus for recording high frequency signals in the form of a low frequency envelope, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention to be comprehended within the meaning and range of equivalence of the following claims.

What is claimed as new and desired to be secured by Letters Patent is:

1. In a recording arrangement, in combination, a recording instrument having a given frequency range and adapted to record an alternating electrical wave which varies in amplitude and in frequency within said range; rectifying means adapted to receive a signal wave varying in amplitude and in frequency within a frequency range substantially larger than said given frequency range of said recording instrument, for rectifying said signal wave; integrating means coupled to the output of said rectifying means for deriving therefrom an integrated wave which corresponds to the envelope of said signal wave after rectification thereof; oscillator means for producing a monofrequency oscillation within the frequency range of said recording instrument; modulating means in circuit with said oscillator and said integrating means for modulating said monofrequency oscillation with said integrated wave; and means in circuit with said oscillator adapted to supply the modulated oscillation to said recording instrument having said given frequency range so that a wave form corresponding to said wave envelope is recorded instead of said signal wave.

2. In heart sound recording apparatus, in combination, a recording instrument having a frequency range which is only a fraction of the frequency spectrum of the heart sounds it is desired to record; means for producing an electrical signal proportional to said heart sounds; rectifying means adapted to receive said electrical signal for rectifying the same; integrating means coupled to the output of said rectifying means for deriving therefrom an integrated voltage wave which corresponds to the envelope of said signal after rectification thereof; an oscillator for producing a monofrequency oscillation within the frequency range of said recording instrument; modulating means coupled between said integrating means and said oscillator for amplitude modulating said oscillation with said integrated wave, whereby a modulated oscillation is produced at the output of said oscillator; and means coupled between said oscillator and said recording instrument for supplying said modulated oscillation to said recording instrument so as to record the same instead of said heart sounds.

3. In a heart sound recording apparatus, in combination, a direct writing recording instrument having a frequency range extending from zero cycles per second to about 150–200 cycles per second, said frequency range being only a fraction of the frequency spectrum of the heart sounds it is desired to record; means for producing an electrical signal proportional to said heart sounds; rectifying means adapted to receive said electrical signal for rectifying the same; integrating means coupled to the output of said rectifying means for deriving therefrom an integrated voltage wave which corresponds to the envelope thereof; an oscillator for producing a monofrequency oscillation within the frequency range of said recording instrument; modulating means coupled between said integrating means and said oscillator for amplitude modulating said oscillation with said integrated wave, whereby a modulated oscillation is produced at the output of said oscillator; and means coupled between said oscillator and said recording instrument for supplying said modulated oscillation to said recording instrument so as to record the same instead of said heart sounds.

4. In a recording apparatus, in combination, a recording instrument having a given frequency range and adapted to record an alternating electrical wave which varies in amplitude and in frequency within said range; rectifying means adapted to receive a signal wave varying in amplitude and in frequency within a frequency range substantially larger than said given frequency range of said recording instrument, for rectifying the said signal wave and providing a rectified wave; a source of constant frequency electrical signals having control means for varying the amplitude of said signals, said constant frequency being within said given frequency range; means for coupling the output of said rectifying means to said control means so that said rectified wave is applied to said control means to vary the amplitude of said constant frequency electrical signal in accordance with said rectified wave; and means for transmitting the amplitude modulated output of said constant frequency generator to said recording instrument so that said output is recorded thereby instead of said signal wave.

References Cited in the file of this patent

UNITED STATES PATENTS

| | | |
|---|---|---|
| 2,017,126 | Kroger | Oct. 15, 1935 |
| 2,183,717 | Keall | Dec. 19, 1939 |
| 2,469,383 | Gibbs et al. | May 10, 1949 |
| 2,578,133 | Hawkins | Dec. 11, 1951 |
| 2,611,859 | Bailey et al. | Sept. 23, 1952 |
| 2,638,401 | Lukacs | May 12, 1953 |
| 2,661,734 | Holzer | Dec. 8, 1953 |
| 2,689,161 | Marchand | Sept. 14, 1954 |
| 2,726,131 | Skelton | Dec. 6, 1955 |

FOREIGN PATENTS

| | | |
|---|---|---|
| 574,873 | Germany | Apr. 21, 1933 |